US006420837B2

(12) United States Patent
Boulesteix

(10) Patent No.: US 6,420,837 B2
(45) Date of Patent: Jul. 16, 2002

(54) ANTENNA DRIVER WITH CONSTANT PEAK CURRENT

(75) Inventor: Xavier Boulesteix, St Maur des Fosses (FR)

(73) Assignee: Valeo Electronique, Creteil (FR)

( * ) Notice: Subject to any disclaimer, the term of this patent is extended or adjusted under 35 U.S.C. 154(b) by 0 days.

(21) Appl. No.: 09/836,389

(22) Filed: Apr. 18, 2001

(30) Foreign Application Priority Data

Apr. 19, 2000 (FR) .......................................... 00 05043

(51) Int. Cl.[7] ......................... H05B 37/02; H04L 27/00; H01Q 1/32

(52) U.S. Cl. ....................... 315/219; 315/291; 375/259; 343/713

(58) Field of Search ................................ 323/283, 328; 343/713, 711; 315/219, 291; 375/258, 257, 259; 340/425.5, 480, 500, 540, 542

(56) References Cited

U.S. PATENT DOCUMENTS

| | | | |
|---|---|---|---|
| 5,831,420 A | 11/1998 | Myers | 323/282 |
| 5,914,849 A | 6/1999 | Perreira | 361/187 |
| 5,969,515 A | 10/1999 | Oglesbee | 323/283 |
| 6,016,260 A | 1/2000 | Heeringa | 363/21 |
| 6,167,094 A | * 12/2000 | Reiner | 375/258 |

FOREIGN PATENT DOCUMENTS

| | | |
|---|---|---|
| GB | 2316775 | 3/1998 |

* cited by examiner

*Primary Examiner*—Jessica Han
(74) *Attorney, Agent, or Firm*—Liniak, Berenato, Longacre & White

(57) ABSTRACT

The electronic circuit which is intended to feed a magnetic-field sending coil has a first input terminal (1) for receiving a power-supply voltage (Ubat), a second input terminal (2) for receiving a periodic control signal (SC), an output terminal (4) for applying an output voltage (U) at the terminals of the said sending coil (L), in such a way as to convert the said periodic control signal into a periodic magnetic field sent out by the coil. In this circuit, the said output voltage (U) is a periodic signal having a period identical to the period of the control signal (SC), and a duty cycle which depends on the power-supply voltage (Ubat) so that a current flowing in the coil has a peak intensity corresponding to a reference peak intensity. With such a configuration, the range of the magnetic field sent out by then sending coil is not subject to the influences of a variation in the power-supply voltage.

3 Claims, 4 Drawing Sheets

ANTENNA DRIVER WITH CONSTANT PEAK CURRENT

The invention relates to an electronic circuit intended to feed a coil sending out a magnetic field, having a first input terminal for receiving a power-supply voltage, a second input terminal for receiving a periodic control signal in a predefined frequency range, an output terminal for generating an output current in the said sending coil connected between the said output terminal and earth, in such a way as to convert the said periodic control signal into a periodic magnetic field sent out by the coil.

Such a circuit is intended particularly to feed a magnetic-field sending coil forming an antenna in a system, called "hands-free" system, for access to an enclosed space, this enclosure possibly being a motor vehicle, for example. Such a system may also serve to allow or prevent a vehicle being started. Such a system generally includes a recognition device having an antenna in the form of a coil, which sends out a periodic magnetic field in order to carry on an exchange of data with an identification unit to be authenticated. For this application, the two characteristics of this magnetic field which are of use are its frequency and its radiation pattern. Conventionally, the circuit for feeding the sending coil receives a control signal at a given frequency and applies to the sending coil a voltage age which has the frequency of the control signal and which has as its amplitude the amplitude of the voltage of the battery of the vehicle.

In a vehicle equipped with a 12-volt-type battery, for example, the power-supply voltage of the battery may fluctuate between 10 and 16 volts; thus, when these fluctuations have direct repercussions on the amplitude of the output voltage which is applied to the sending coil, corresponding fluctuations ensue in the range of the magnetic field. These fluctuations are prejudicial, since it is desired that the authentication of the identification unit can always be carried out under standard conditions, such as a minimum standard distance between the user and the vehicle, for example.

This problem can be remedied by integrating a voltage regulator into the feed circuit of the sending coil, in order to have a radiation pattern of the magnetic field the shape of which does not vary as a function of the fluctuations in the power-supply voltage. The defect in this solution is the increase in the cost of manufacture of the feed circuit.

The object of the invention is to remedy these drawbacks.

To that end, the subject of the invention is an electronic circuit intended to feed a coil sending out a magnetic field, having a first input terminal for receiving a power-supply voltage, a second input terminal for receiving a periodic control signal, an output terminal for applying an output voltage to the terminals of the said sending coil, so as to convert the said periodic control signal into a periodic magnetic field sent out by the coil, characterized in that the said output voltage is a periodic signal having a period identical to the period of the control signal and a duty cycle which depends on the power-supply voltage, so that a current flowing in the coil has a peak intensity corresponding to a reference peak intensity.

With such a configuration, the feed circuit manages the peak intensity of the current which passes through the sending coil so that it is always equal to a reference peak intensity; thus, the range of the magnetic field sent out by the coil does not fluctuate as a function of the variations in the power-supply voltage supplied by the battery, and this without having to integrate a voltage regulator into the feed circuit In one preferred embodiment of the circuit according to the invention, the reference peak intensity is adjustable, which makes it possible, for example, to alter the range of the magnetic field sent out by the coil in order more finely to evaluate the physical location of an identification unit to be authenticated in the course of a data exchange.

The invention will now be described by reference to the attached drawings which illustrate one embodiment of it by way of non-limiting example.

Figure 3:
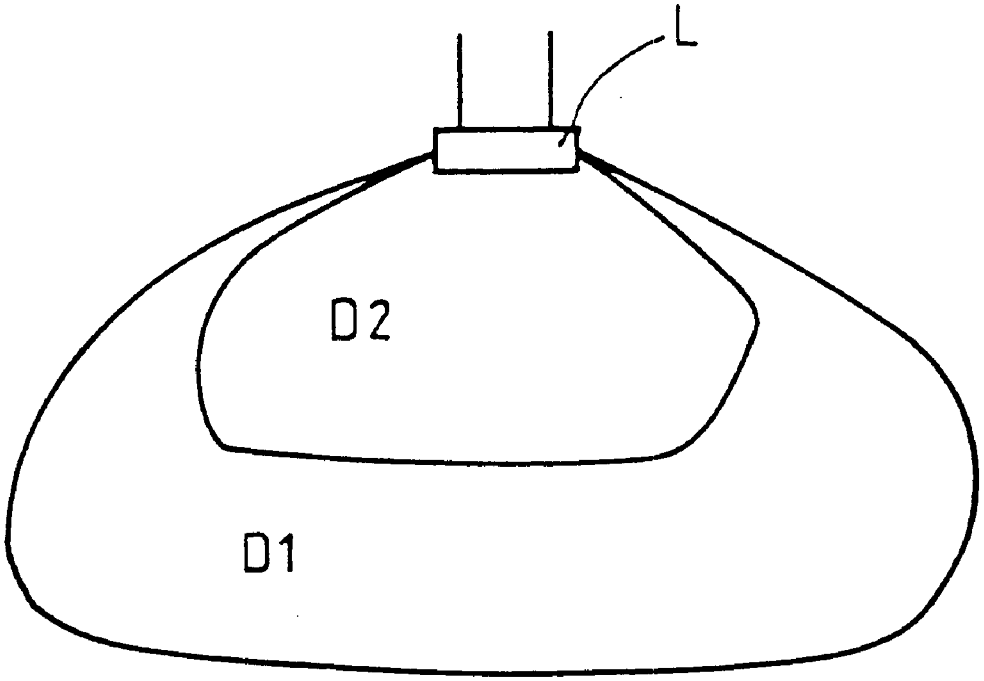

FIG. 3 gives an example of modulation of the range of the radiation pattern of the magnetic field.

Figure 1:
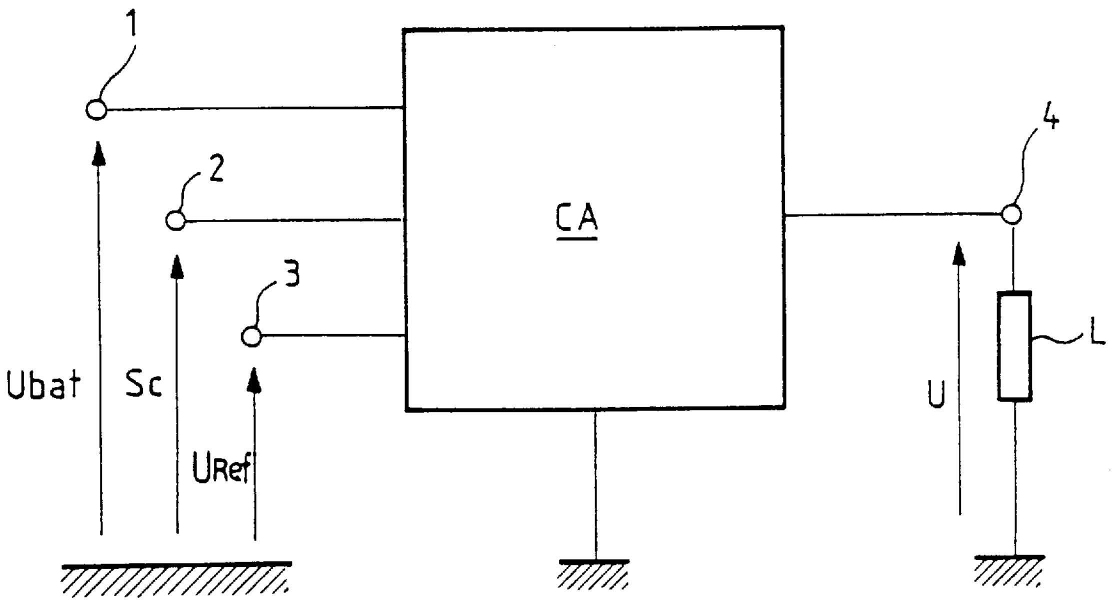
FIG. 1 is a view of a diagrammatic assembly comprising a drive circuit and a sending coil.

FIG. 1 is a diagrammatic representation of a feed circuit CA according to the invention which is connected to a magnetic-field sending coil L. This circuit which is connected to earth, comprises a first input terminal 1 intended to receive a power-supply voltage Ubat supplied by a battery of the vehicle and which can vary over time, a second input terminal 2 which is intended to receive a periodic, squarewave control signal SC, and a third input terminal 3 for receiving a reference voltage Uref. As output, this feed circuit includes a terminal 4 which is intended to apply an output voltage U to the magnetic-field sending coil L, which is connected, on the one hand, to this terminal 4 and, on the other hand, to earth. It should be noted that the reference voltage Uref is a constant voltage corresponding to a reference peak current Iref desired in the sending coil L. This feed circuit CA comprises an MOS transistor (not represented) which is connected between the first input terminal 1 and the output terminal 4, and which is driven by a control voltage internal to the feed circuit according to the invention. In this way, the voltage U applied to the terminals of the sending coil L is equal to Ubat when the transistor is turned on.

Figure 2A:
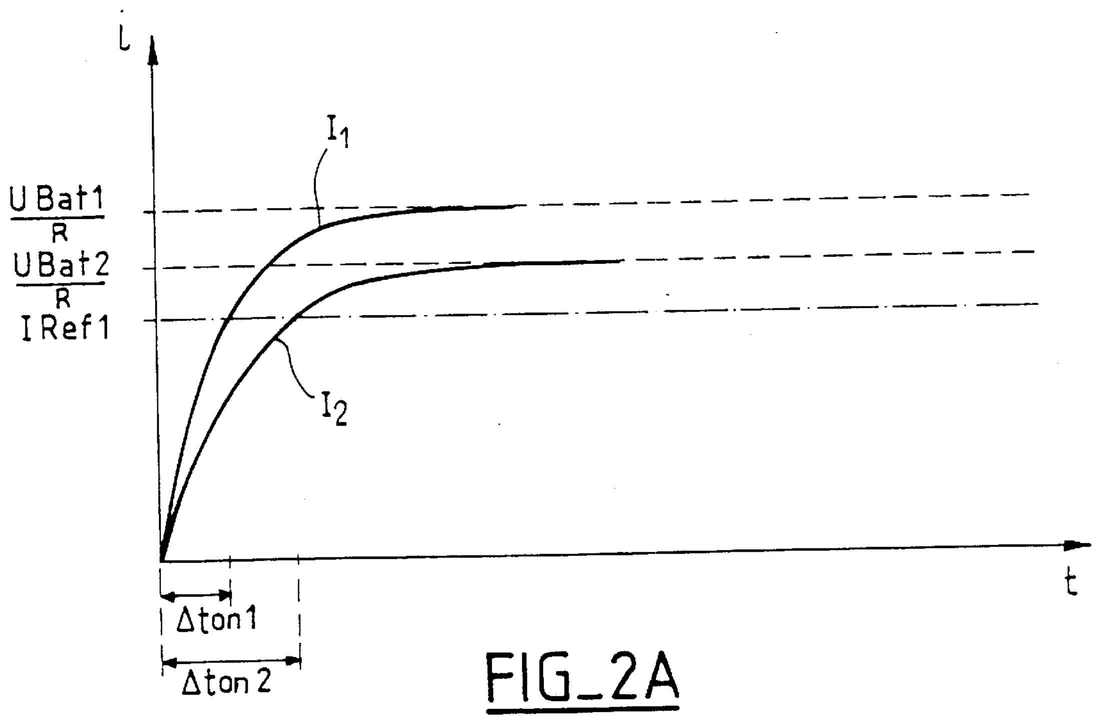
FIG. 2A is a graphical representation of the current which flows through a sending coil when a constant voltage is applied to it.

FIG. 2*a*, which is a general figure intended to show how a load current is established in a coil, depicts a time/intensity graph showing a first curve I1 of the establishing of a current in a coil with resistance R, which could be the sending coil L, at the terminals of which is applied a first constant feed voltage Ubat1 as from the instant t=0. In a similar way, a second curve I2 represents the establishment of the current in the coil for a second, constant feed voltage Ubat2.

More generally, this graph shows that the limit intensity of the current in the coil is equal to Ubat/R, in the case in which a constant voltage equal to Ubat is applied to the terminals of the coil. Moreover, it can be seen that the curves I1 and I2 of establishment of the currents have different shapes, such that, if a reference peak intensity is set, such as Iref1, for example, less than Ubat1/R and less than Ubat2/R, to be reached in the coil, the time necessary to reach this intensity has a different value Δton1, Δton2, depending on whether the constant voltage applied to the terminals of the coil is Ubat or Ubat2. Quantitatively, the lower the voltage Ubat applied, the longer the time to reach an intensity Iref.

Figure 2B:
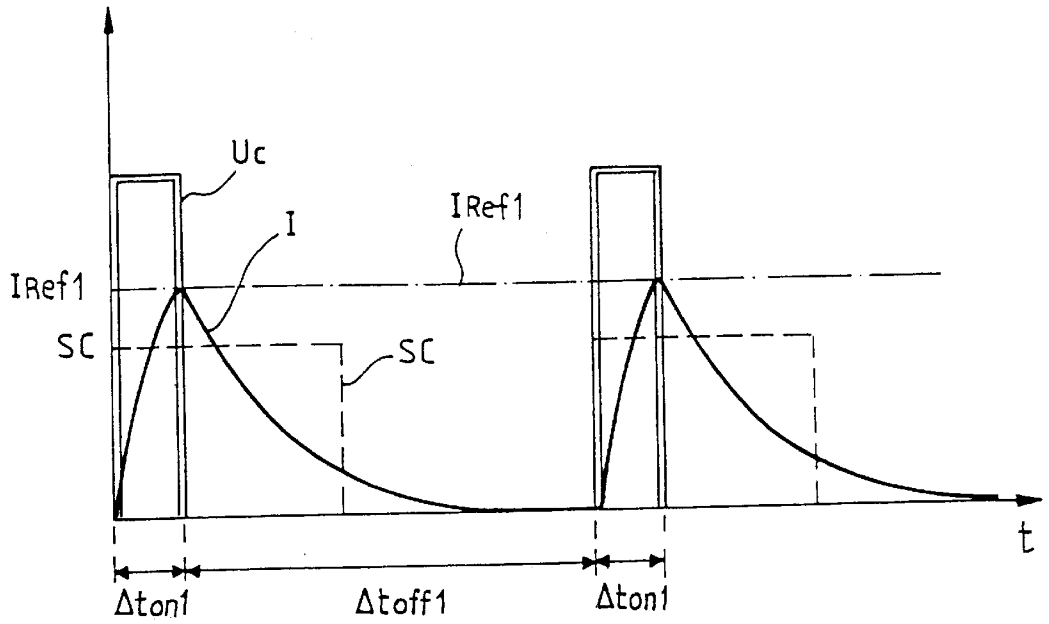
FIG. 2B is a graphical representation of the current which passes through the sending coil for a first value of the feed voltage of the circuit according to the invention.

FIG. 2B depicts a graph showing how a squarewave control signal SC having a frequency f is converted by the feed circuit CA according to the invention into the control voltage Uc in order to obtain a current I in the sending coil L, this current in the sending coil having a frequency of f, and a peak intensity of the reference peak intensity Iref1. This control voltage Uc controls the on or off state of the transistor MOS in such a way that it is on when Uc is not zero and off otherwise.

As car. be seen on this graph, when the circuit receives the rising edge of a square wave of the control signal, it applies the voltage Ubat1 to the terminals of the sending coin L for a time Δton1 corresponding to the time necessary for the current in the sending coil to reach the value Iref1, then, for a time interval Δtoff1, the voltage Ubat1 is no longer applied to the terminals of the sending coil, so that the current in it decreases. Thus a periodic control signal SC of frequency f is converted into a current I in the sending coil, of frequency f and the peak intensity of which is equal to Iref1.

Figure 2C:
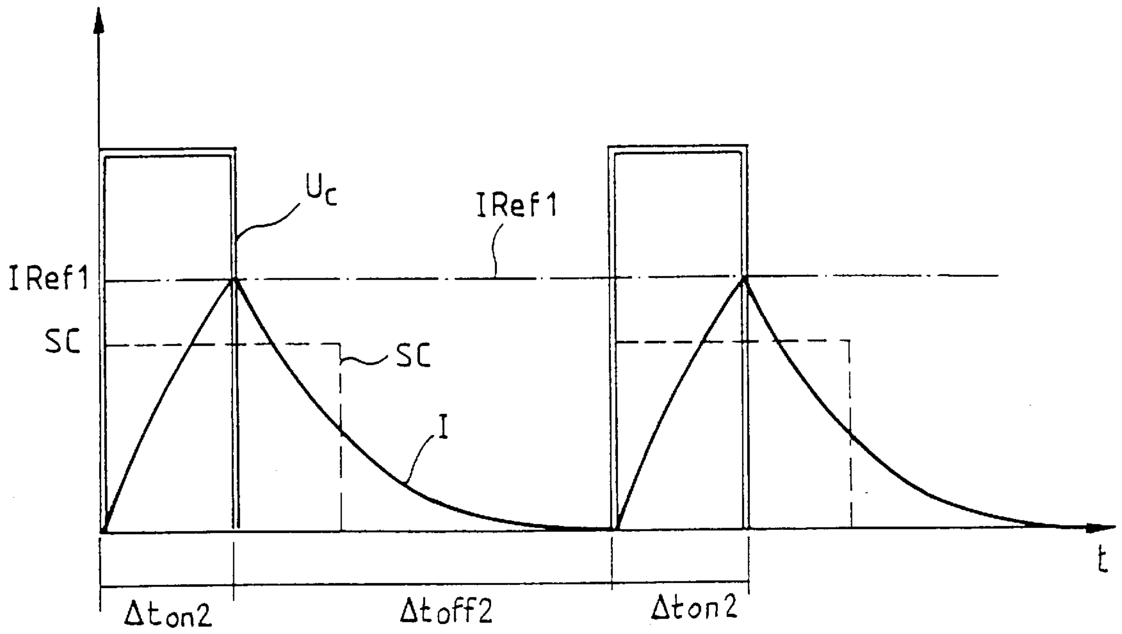
FIG. 2C is a graphical representation of the current which passes through the sending coil for a second value of the feed voltage of the circuit according to the invention.

In FIG. 2C, which is a graph representing the same signals as those of FIG. 2B, for the case where the power-supply voltage is equal no longer to Ubat1 but to Ubat2, with Ubat2<Ubat1, it can be seen that the time Δton2 necessary for the current in the sending coil L to reach the value Iref1 is greater than the time Δton1 which appeared in FIG. 2B. Thus the feed circuit according to the invention is capable of converting a control signal SC into a current I in the sending coil L having a peak intensity equal to Iref1 independently of the variations in the power-supply voltage supplied by the battery of the vehicle.

In a more general way, the square-wave control signal SC is converted into a periodic control signal with rectangular profile Uc having a duty cycle r which is suitable for the duration Δton during which the voltage from the battery Ubat is applied to the terminals of the sending coil to correspond to the duration necessary for the current in the sending coil to reach the value Iref. Hence, the duty cycle r which is equal to r=Δton/(Δton+Δtoff) is calculated on the basis of Δton in order to comply with the condition Δton+Δtoff=p, in which p designates the period of the control signal (p=1/2 nf).

The time Δton is established as a function of the power-supply voltage Ubat, of the resistance R and of the inductance L of the sending coil, and finally of the peak current Iref desired in the sending coil. For a sending coil having an inductance L and a resistance R, the charging time Δton necessary to reach an intensity Iref at a power-supply voltage Ubat can be approximated by the relationship:

$$\Delta ton \cong -(L/R).\ln(1-(R.\ Iref/Ubat)) \qquad (*)$$

where ln designates the Napierian logarithm function.

Figure 2D:
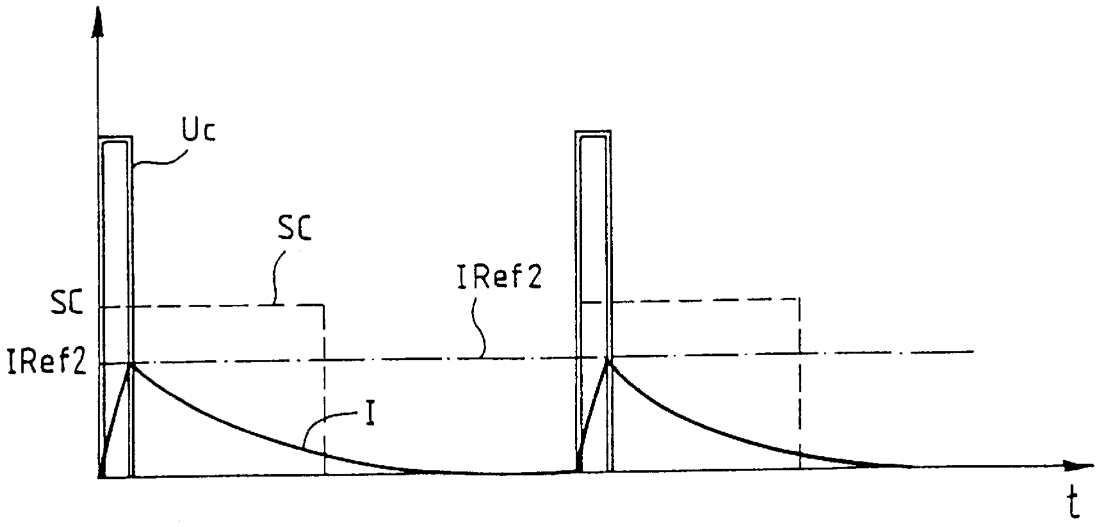
FIG. 2D is a graph illustrating the possibility of setting up the reference peak intensity.

In FIG. 2D, which is a graph representing the same signals as those of FIGS. 2B and 2C, for the case in which the power-supply voltage is equal to Ubat1 and in which the reference current is no longer equal to Iref1 but Iref2, with Iref2<Iref1, it can be seen that the feed circuit according to the invention is capable of converting a control signal into a current in the sending coil having a peak intensity equal to Iref2. Thus, the feed circuit according to the invention interprets the voltage Uref so as to deduce therefrom the reference peak current Iref, in order to deduce therefrom the corresponding duty cycle r. As in the preceding cases described by FIGS. 2A, 2D and 2C, the feed circuit adjusts the duty cycle of the control voltage Uc so that the peak current in the sending coil has the desired value.

The feed circuit according to the invention may, for example, comprise a microcontroller for calculating the value Δton as a function of the relationship (*) or of and expression approximating to it, and, for example, to control the turning off and the turning on of an MOS transistor connected between the input terminal 1 and the output terminal 4. The microcontroller could also choose the value of Δton from a data table which it contains. Thus, the MOS transistor will be turned on when the control voltage Uc is non-zero, for the period Δton, so that the current I in the coil L reaches the value of the peak current Iret, then the MOS transistor will be turned off for the period Δtoff so that the current in the sending coil decreases until the control voltage Uc is again nor-zero. In a general way, an evaluation of the power-supply voltage Ubat of the battery of the vehicle is carried out in order to calculate the value Δton and this same value is then used throughout the period of a day to exchange between the recognition device and the identification unit.

In another embodiment, the value Δton could be generated by a specialized electronics circuit.

As far as the shape of the signal corresponding to the current in the sending coil is concerned, it should be noted that it can take the form of a triangular signal having a profile close to that which is given in FIGS. 2A, 2B, 2C and 2D, having regard to the characteristics specific to the electronic components used.

The sending, as regards the recognition device the purpose of which is generally to transmit a train of bits towards an identification unit, could, for example, be carried out at frequencies of 125 kHz and 133 kHz. In this case, it is agreed, for example, that the sending of a 125 kHz signal for 1 ms corresponds to the sending of a bit equal to 1, and that the sending of a 133 kHz signal for 1 ms corresponds to the sending of a bit equal to 0, which allows the identification unit to reconstitute the train of bits sent by the recognition device by analyzing the received signal. In this way, in order to send the bit train 1011, the recognition device will send at 125 kHz for 1 ms, then at 133 kHz for 1 ms, then at 125 kHz for 2 ms.

FIG. 3, which is an illustration of the diagram of the magnetic field sent by a sending coil, comprises a sending coil L and sending diagrams D1 and D2 corresponding, for example, to the reference peak intensities Iref1 and iref2. In fact, the radiation pattern of a magnetic field sent out by a sending coil is proportional to the current which is passing through the coil. Thus, the range of the field sent out is therefore proportional to the value Iref of the reference peak intensity chosen. Finally, having regard to the fact that the magnetic-field sending coil is generally placed in proximity to the metal bodywork of the vehicle, capacitive phenomena which arise between the sending coil and the sheet metal may give rise to the sending of an electric field of the same frequency as the magnetic field sent out, so that the field sent out is then an electromagnetic field.

The invention is not reserved solely for the embodiments described above, and also be applied to any field in which it is desired to feed a sending coil in order to send out a magnetic field according to a diagram which remains stable independently of the fluctuations in the power-supply voltage.

I claim:

1. Electronic circuit intended to feed a coil sending out a magnetic field, having a first input terminal (1) for receiving a power-supply voltage (Ubat), a second input terminal (2) for receiving a periodic control signal (SC), an output terminal (4) for applying an output voltage (U) to the terminals of the said sending coil (L), so as to convert the said periodic control signal into a periodic magnetic field sent out by the coil, wherein the said output voltage (U) is a periodic signal having a period identical to the period of the control signal (SC) and a duty cycle which depends on the power-supply voltage (Ubat), so that a current flowing in the coil has a peak intensity corresponding to a reference peak intensity.

2. Electronic circuit as claimed in claim 1, wherein the reference peak intensity is adjustable in order to be able deliberately to alter the range (D1, D2) of the magnetic field sent out.

3. A system, called hands-free system, intended to control the unlocking of openable parts of a vehicle and/or to allow the starting of a vehicle, comprising an electronic circuit as claimed in claim 1, wherein the power-supply voltage is supplied by a battery of the vehicle.

* * * * *